(12) United States Patent
Hirayama

(10) Patent No.: US 7,595,913 B2
(45) Date of Patent: Sep. 29, 2009

(54) ORIGINAL READING UNIT, IMAGE FORMING APPARATUS AND IMAGE SCANNER

(75) Inventor: Shinobu Hirayama, Chiba (JP)

(73) Assignee: Seiko Infotech Inc. (JP)

( * ) Notice: Subject to any disclaimer, the term of this patent is extended or adjusted under 35 U.S.C. 154(b) by 903 days.

(21) Appl. No.: 11/230,902

(22) Filed: Sep. 20, 2005

(65) Prior Publication Data

US 2006/0087704 A1    Apr. 27, 2006

(30) Foreign Application Priority Data

Oct. 25, 2004    (JP) .............................. 2004-310149

(51) Int. Cl.
*H04N 1/04* (2006.01)

(52) U.S. Cl. ..................... 358/471; 358/474

(58) Field of Classification Search ......... 358/471–498, 358/514, 513, 512, 505; 257/E23.001–E23.009, 257/E21.499; 250/208.1
See application file for complete search history.

(56) References Cited

U.S. PATENT DOCUMENTS

| | | | |
|---|---|---|---|
| 4,734,787 A * | 3/1988 | Hayashi | ...................... 358/409 |
| 5,267,043 A | 11/1993 | Rottner et al. | |
| 5,825,510 A | 10/1998 | Imamura | |
| 6,157,467 A | 12/2000 | Tsai | |
| 6,717,702 B1 | 4/2004 | Yamauchi et al. | |
| 6,801,343 B1 * | 10/2004 | Sheng | ......................... 358/474 |
| 2002/0054380 A1 * | 5/2002 | Takeuchi et al. | ............ 358/498 |

* cited by examiner

*Primary Examiner*—Benny Q Tieu
*Assistant Examiner*—Qian Yang
(74) *Attorney, Agent, or Firm*—Adams & Wilks

(57) ABSTRACT

An original reading unit has first and second arrays of sensor assemblies extending in a main scanning direction for performing readings of an original document. Each of the sensor assemblies includes a sensor holder that undergoes pivotal movement about a single rotation center as a fulcrum along a wall of a unit base to bring the sensor holder to a predetermined position whereat the sensor holder can be fixed to the units base wall. A line sensor is mounted relative to the sensor holder so as not to be shifted in the main scanning direction or in a sub-scanning direction, and to undergo movement in an approaching or a separating direction so as to be brought into contact with or separated from, respectively, the unit base wall and an original support plate attached to the unit base. A focus setup unit moves the line sensor in the approaching or separating direction and positions the line sensor at a location whereat focus can be adjusted.

9 Claims, 15 Drawing Sheets

ORIGINAL READING UNIT, IMAGE FORMING APPARATUS AND IMAGE SCANNER

BACKGROUND OF THE INVENTION

1. Field of the Invention

The present invention relates to an original reading unit that employs line sensors to read image information from an original document (hereinafter "original"), an image scanner that includes the original reading unit and externally outputs the image information obtained by the original reading unit, and an image forming apparatus, such as a copier or a facsimile machine, that includes the original reading unit and that copies the image information obtained by the original reading unit.

2. Related Background Art

For a copier, an original reading apparatus is well known wherein multiple line sensors are arranged in a zigzag pattern to extend a first array and a second array in the main scanning direction, and an original that is first read by the line sensors of the first array, is then sequentially read by the line sensors of the second array, which is shifted, relative to the first array, in the sub-scanning direction (see, for example, Japanese Unexamined Patent Publication No. Sho 60-31357 (page 1, right column, last line to page 2, upper left column, line 12; page 2, lower left column, line 16 to page 3, upper right column, last line; and FIGS. 1(a) and 1(b))).

According to the configuration wherein the first array and the second array are shifted relative to each other in the sub-scanning direction, the individual line sensors in these arrays must be arranged in parallel, and the focal distances of the line sensors must be the same. In order to arrange the line sensors in parallel, the positions of the line sensors should be adjusted in the main scanning direction (X direction) and in the sub-scanning direction (Y direction), relative to a base, such as a substrate, on which the line sensors are to be mounted. Further, in order to control the focusing, the positions of the line sensors should also be adjusted in the direction (the Z direction) in which the line sensors are brought into contact with or are separated from the face of the original.

However, the arrangement wherein the adjustment of the parallel arrangement of the line sensors is enabled and the arrangement wherein the adjustment of the focusing of the line sensors is enabled are not described in Japanese Unexamined Patent Publication No. Sho 60-31357 described above.

Commonly, for the adjustments in the X, Y and Z directions, multiple adjustment screws are employed to individually move the line sensors, while accurate jigs must be employed to position them. During this adjustment operation, however, a procedure is required for repetitively moving the longitudinal positions of the ends of each line sensor both in the X and in the Y directions, and after the adjustments in the X and the Y directions have been completed, the longitudinal positions of the ends of each line sensor must be adjusted. As described above, since for such adjustments many procedures must be performed, a great deal of labor is required, and there is a demand for an improvement in this process.

SUMMARY OF THE INVENTION

One objective of the present invention is to provide an original reading unit that can provide improved efficiency for the adjustment of the individual line sensors, and an image forming apparatus and an image scanner that employ the original reading unit.

According to one aspect of the present invention, an original reading unit, as a prerequisite, comprises:

a unit base;

a transparent original support plate attached to the unit base; and multiple sensor assemblies arranged, in a zigzag pattern, to form on the unit base a first array, extended in a main scanning direction, for performing the first reading of an original, and a second array, also extended in the main scanning direction, for reading the original following the first array.

In order to achieve the above described objective, each of the sensor assemblies includes:

a sensor holder, which, as a fulcrum, can be pivoted at a single rotation center, along a wall of the unit base, to a predetermined position and fixed to the wall;

a line sensor, which is held, relative to the sensor, so as not to be shifted in the main scanning direction or in the sub-scanning direction and which is movable, in an approaching or a separating direction, so as to be brought into contact with and separated from the wall and the original support plate; and a focus setup unit, which moves the line sensor in the approaching or separating direction and which positions the line sensor at a location whereat focus can be adjusted.

According to this invention, the unit base is defined as a member to which the original support plate is attached and on which multiple sensor assemblies are arranged to form a zigzag pattern. The original support plate is a transparent plate that the copy face of an original contacts. For this, a glass plate is appropriate but a transparent synthetic resin plate, such as an acrylic board, can also be employed. According to this invention, a single rotation center, around which the sensor holder is pivoted, is located at the center, so that the parallel positioning of the line sensors can be adjusted. The position of the rotation center relative to the sensor holder is arbitrary, and the rotation center can, for example, be provided in the longitudinal center portion of the sensor holder. The rotation center can also be formed by employing an axle, projecting outward from one wall of the unit base or one side of the sensor assemblies, and a bearing, such as a hole or a notch, that is formed in the other side and engages the axle. Further, the axle may be integrally formed with the wall of the unit base or the sensor assembly, or may be a separate part. In addition, according to this invention, the main scanning direction is the direction in which scanning is performed by the line sensors, the sub-scanning direction is the direction in which the original is fed, and the approaching or separating direction is that in which the line sensors are brought into contact with or separated from the wall and the original support plate, and is perpendicular to the main scanning direction and the sub-scanning direction. Furthermore, the predetermined position is a position such that the sensor holder, which holds the line sensors, is rotated to adjust the positioning of the line sensors and so locate them that they are parallel. Further, in this invention, although screws may be employed as positioning means, urging members are more preferable, and springs, for example, or more appropriately, coil springs are employed.

According to the invention, the line sensors are held by the sensor holders so that they do not move in the main scanning direction or the sub-scanning direction, and the sensor holder is rotated, as a fulcrum, at the single rotation center and is fixed in a predetermined location. In this manner, the positions of the line sensors can be adjusted simultaneously, both in the main scanning direction and in the sub-scanning direction. In this case, a procedure for delicately adjusting the two longitudinal ends of each line sensor is not required. In addition, by using the focus setup unit, the line sensors can be moved in the approaching or separating direction to adjust the focuses.

According to another preferred aspect of the original reading unit of the invention, a first urging member that pushes a line sensor from one longitudinal end in the main scanning direction and a second urging member that pushes the line sensor in the sub-scanning direction are employed to hold the line sensor, relative to the sensor holder, so that it can not to be moved in the main scanning direction and the sub-scanning direction. For this aspect, a leaf spring, a coil spring, a porous flexible sponge member or a non-porous rubber member can be employed for the first and the second urging members. According to this aspect, regardless of the dimensional tolerances of parts such as the line sensors and the sensor holder, the line sensors can be held by the urging forces of the first and the second urging members, so as not to be moved relative to the sensor holder in the main scanning direction and the sub-scanning direction. This is preferable because then, the adjustment procedure for holding the line sensors is not especially required.

According to another preferred aspect of the original reading unit of the invention, at least part of the rotation center is located in a projection area for the line sensors, relative to the wall. This aspect is preferable because the range of an angle whereat the sensor holder is rotated can be reduced, making it possible to adjust the positions of the line sensors in both the main scanning direction and the sub-scanning direction.

According to an additional preferred aspect of the original reading unit, the rotation center is located immediately under, or in the vicinity of, a light-receiving device, the first that is read among an array of light-receiving devices for the line sensors. This aspect is preferable because the range of an angle whereat the sensor holder is rotated can be reduced, making it possible to adjust the positions of the line sensors in both the main scanning direction and the sub-scanning direction.

According to a further aspect of the original reading unit of the invention, the focus setup unit includes:

pressing members, for moving the line sensors toward the original support plate; and spacers, which are sandwiched between the line sensors and the original plate support to define focal distances for the line sensors. According to this aspect, with the spacer sandwiched between the line sensors and the original support plate, the line sensors are moved and pressed toward the original support plate by the pressing member, so that the focal distances of the line sensors can be defined by the spacer and their focuses can be adjusted.

According to one more aspect of the original reading unit of the invention, an urging member is employed as the pressing member. A leaf spring, a coil spring, a porous flexible sponge member or a non-porous flexible rubber member can be employed as the urging member. This aspect is preferable because the positions of the line sensors, in the direction of the thickness of the original support plate, can be automatically designated by the urging force exerted by the urging member, without requiring the employment of a procedure for delicately adjusting the two longitudinal ends of each line sensor.

According to yet another aspect of the original reading unit of the invention, a first support member that includes a guide portion, for guiding the line sensors that move in the approaching or separating direction, and for regulating the movement of the line sensors in the sub-scanning direction, and a stopper portion, for regulating the movement of the line sensors in the main scanning direction, is attached to one longitudinal end of the sensor holder; a second support member, which includes a guide portion for guiding the line sensors that move in the approaching or separating direction and for regulating the movement of the line sensors in the sub-scanning direction, is attached to the other longitudinal end of the sensor holder; fitting portions, which are slidably fitted into the guide portions of the first and second support members, and an engagement portion, which abuts upon the stopper portion, are formed for the line sensors; first urging members are attached to the first support portion to apply an urging force, in the main scanning direction, to the line sensors, thereby causing the engagement portion to abut upon the stopper portion, and second urging members are sandwiched between the sensor holder and the line sensors to apply an urging force, in the sub-scanning direction, to the line sensors; and pressing members, which are formed of the first and second urging members, are sandwiched between the first and second support members and the line sensors; the spacers, which define the focal distances of the line sensors, are sandwiched between the line sensors and the original support plates.

According to this aspect, the first and the second urging members are employed to hold the line sensors, so that they do not move, relative to the sensor holder, either in the main scanning direction or in the sub-scanning direction. When the sensor holder is pivoted, as a fulcrum, at the single rotation center and is fixed in the predetermined position, the positions of the line sensors can be adjusted in the main scanning direction and the sub-scanning direction. In this case, the procedure for delicately adjusting the two longitudinal ends of each line sensor need not be repeatedly performed. Furthermore, by using the pressing members, formed of the urging members and the spacer, the focuses of the line sensors can be automatically adjusted by moving the line sensors in the approaching or separating direction. Also, in this case, the procedure for delicately adjusting the two longitudinal ends of each line sensor need not be performed repeatedly.

In addition, in order to achieve the above described objective, an image forming apparatus according to the present invention comprises an original reader that includes an original reading unit according to one of the above described aspects. Therefore, according to this invention, an image forming apparatus can be provided that includes an original reading unit, which can increase the efficiency with which line sensor adjustments are performed.

Also, to achieve the above described objective, an image scanner according to the invention comprises an original reader that includes an original reading unit according to one of the above described aspects. Therefore, according to this invention, an image scanner can be provided that includes an original reading unit, which can increase the efficiency with which line sensor adjustments are performed.

According to the present invention, when the individual sensor assemblies are rotated, as a fulcrum, around the rotation center, the positions of the sensor assemblies can be adjusted relative to the main scanning direction and the sub-scanning direction of the line sensors, the focuses of which are set by the focus setup unit. Therefore, an original reading unit can be provided that can increase the efficiency with which line sensor adjustments are performed.

According to the present invention, an image forming apparatus can be provided wherein the original reader includes an original reading unit, which can increase the efficiency with which the adjustment of the line sensors is performed.

Further, according to the present invention, an image scanner can be provided wherein the original reader includes an original reading unit, which can also increase the efficiency with which the adjustment of the line sensors is performed.

DETAILED DESCRIPTION OF THE PREFERRED EMBODIMENTS

One embodiment of the present invention will now be described while referring to the accompanying drawings.

Figure 2:
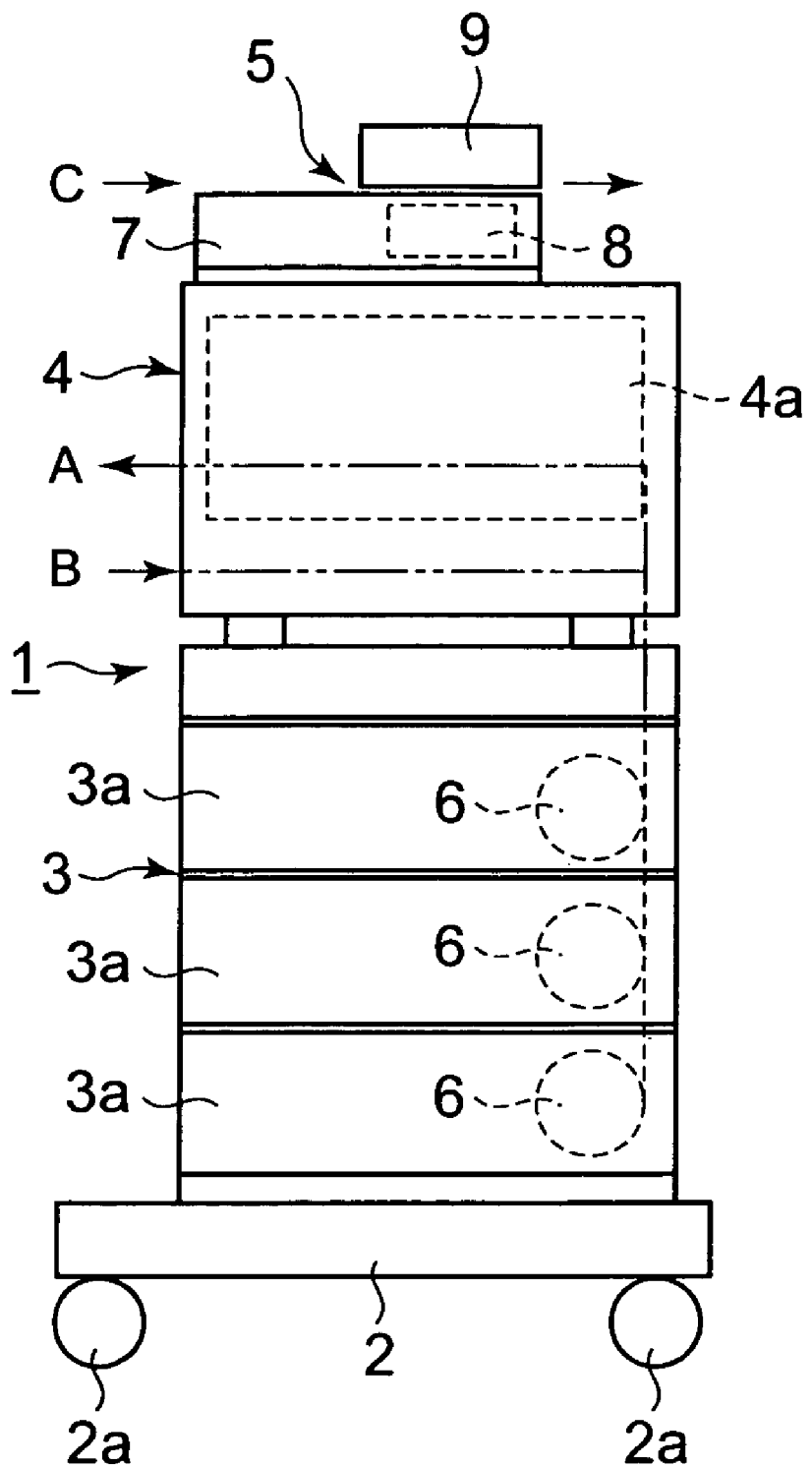
FIG. 2 is a schematic side view of a copier comprising an original reader that includes the original reading unit according to the embodiment of the invention.

In FIG. 2, an image forming apparatus 1 is, for example, an electrographic copier, and comprises: a base 2 having multiple wheels 2a; a paper supply section 3 mounted on the base 2; an image forming section 4 installed on the paper supply section 3; and an original reading section 5 installed on the image forming section 4.

The paper supply section 3 includes multiple paper trays 3a wherein paper supply rollers 6 are provided. As each paper supply roller 6 is rotated, paper sheets stored in the corresponding paper tray 3a are fed one by one to the image forming section 4, as indicated by a chain double-dashed arrow A in FIG. 2, and the sheet is passed through the image forming section 4 and is discharged to the front of the copier 1. A path indicated by an arrow B in FIG. 2 represents the path along which a sheet manually supplied from the front of the copier 1 is conveyed. The manually fed sheet reaches the middle of the convey path extending from the paper tray 3a, and is thereafter passed through the image forming section 4.

The image forming section 4 includes an image forming unit 4a through which the sheet is passed. The image forming unit 4a records an image on the sheet based on digital data, for the image of the original, that is output by the image reading section 5.

In the image reading section 5, an original reading unit 8 is attached to an original table 7, and an original table cover 9 is also attached thereto that can be closed to cover the top face of the original reading unit 8. As indicated by an arrow C in FIG. 2, an original containing an image is supplied to the original reading section 5 from the front of the copier 1, is passed between the original reading unit 8 and the original table cover 9, and is discharged to the rear of the copier 1. The original reading unit 8 photoelectrically reads the original image, and outputs the image as digital data to the image forming unit 4a.

As shown in FIGS. 1A, 1B and 3 to 5, the original reading unit 8, which serves as a close-contact image sensor, includes: a unit base 11, an original support plate 25 and multiple sensor assemblies 31, e.g., five sensor assemblies 31.

Figure 4:
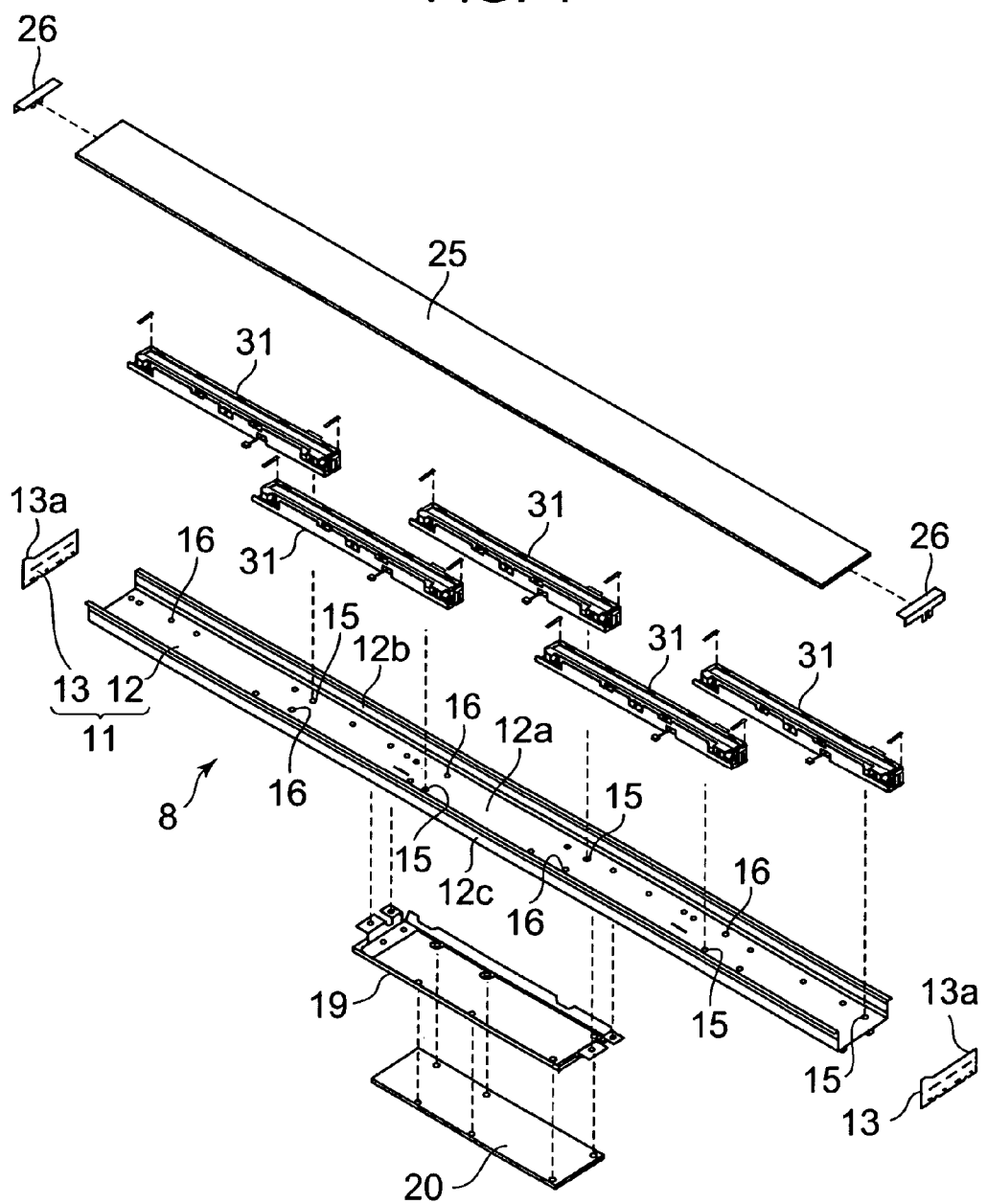
FIG. 4 is an exploded perspective view of the original reading unit in FIG. 3.

As shown in FIG. 4, the unit base 11 is formed of a main base member 12 composed, for example, of an aluminum alloy die material, and a pair of base end members 13 formed of sheet metal. The main base member 12 is shaped like a thin, elongated groove, wherein side walls 12b and 12c are bent upright on both sides of a wall 12a, the bottom wall, and wherein the inner side surfaces are flat. The pair of base end members 13 are attached to the main base member 12, closing the openings at the two longitudinal ends, by using self-tapping screws that are fitted into the main base member 12. Support plate fitting portions 13a are formed on the upper side faces of the base end members 13.

Figure 7:
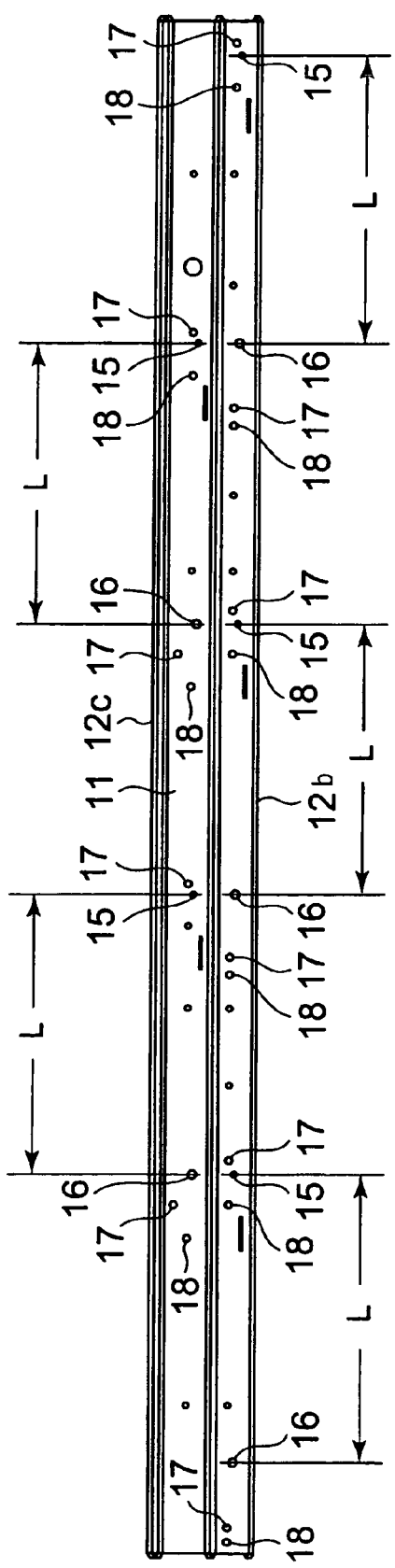
FIG. 7 is a bottom view of the unit base of the original reading unit in FIG. 3.

As shown in FIGS. 4 and 7, three sets, for example, of paired bearing holes 15 and pin through holes 16 are formed, in the wall 12a near the side wall 12b. The bearing hole 15 and the pin through hole 16 in each of the sets are arranged at a predetermined distance L in the longitudinal direction of the unit base 11. A line connecting one set of one bearing hole 15 and one pin through hole 16 is extended in the longitudinal direction of the unit base 11, and the two other sets are positioned along an extension of the line. Similarly, two sets, for example, of paired bearing holes 15 and pin through holes 16 are formed in the wall 12a near the other side wall 12c. The bearing hole 15 and the pin through hole 16 in each of the two sets are also arranged at the predetermined distance L in the longitudinal direction of the unit base 11. A line connecting one set of one bearing hole 15 and one pin through hole 16 is extended in the longitudinal direction of the unit base 12, and the other set is positioned along an extension of the line.

Further, in FIG. 7, the leftmost pin through hole 16 located near the side wall 12c is substantially at the same position, in the longitudinal direction of the unit base 11, as the leftmost bearing hole 15 near the side wall 12b. Also, in FIG. 7, the leftmost bearing hole 15 located near the side wall 12c is substantially at the same position, in the longitudinal direction of the unit base 11, as the middle pin through hole 16 located near the side wall 12b. Similarly, in FIG. 7, the rightmost pin hole 16 located near the side wall 12c is substantially at the same position, in the longitudinal direction of the unit base 11, as the middle bearing hole 15 located near the side wall 12b. Furthermore, in FIG. 7, the rightmost bearing hole 15 located near the side wall 12c is substantially at the same position, in the longitudinal direction of the unit base 11, as the rightmost pin through hole 16 located near the side wall 12b. That is, the five sets of bearing holes 15 and pin through holes 16 are arranged so that they form a zigzag pattern.

Multiple clearance holes 17, for providing clearance for screws, and multiple fastening holes are formed in the wall 12a. In FIG. 4, screws are to be used to secure a substrate support frame 19 to the reverse surface of the wall 12a, and to secure a print circuit board 20 to the substrate support frame 19. Mounted on the print circuit board 20 are various electronic parts (not shown) that constitute reading circuits for reading digital image data from the image reading section 8, and other circuits for appropriately processing the digital image data and outputting the results to the image forming unit 4a.

The original support plate 25 is formed of a flat, transparent plate, such as a transparent glass plate. The two longitudinal ends of the original support plate 25 are fitted into the paired support plate fitting portions 13a, provided for the base end members 13, to close the upper opening of the main base member 12, and are fixed in place by attachment members 26 shown in FIGS. 3 to 5. Pressing portions overlap the upper face at the longitudinal ends of the original support plate 25, and fixing portions, bent downward from the pressing portions, overlap the external faces of the base end members 13. The final attachment of the original support plate 25 to the main base member 12 is accomplished by using screws to fasten the fixing portions to the base end members 13. The inner side surface of the thus secured original support plate 25 is parallel to the inner side surface of the wall 12a of the main base member 12.

Figure 1A:
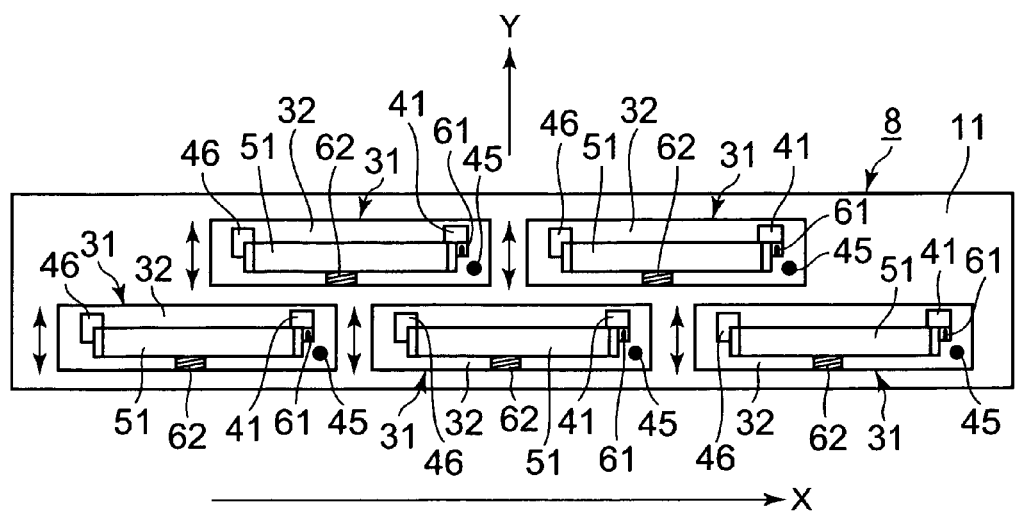
FIG. 1A is a schematic plan view of the concept of an original reading unit according to one embodiment of the present invention.
Figure 1B:
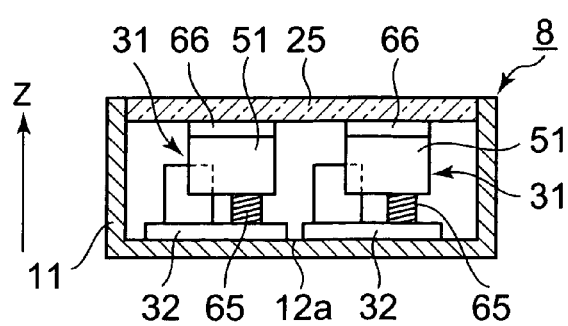
FIG. 1B is a schematic cross-sectional view of the concept of the original reading unit in FIG. 1A.
Figure 3:
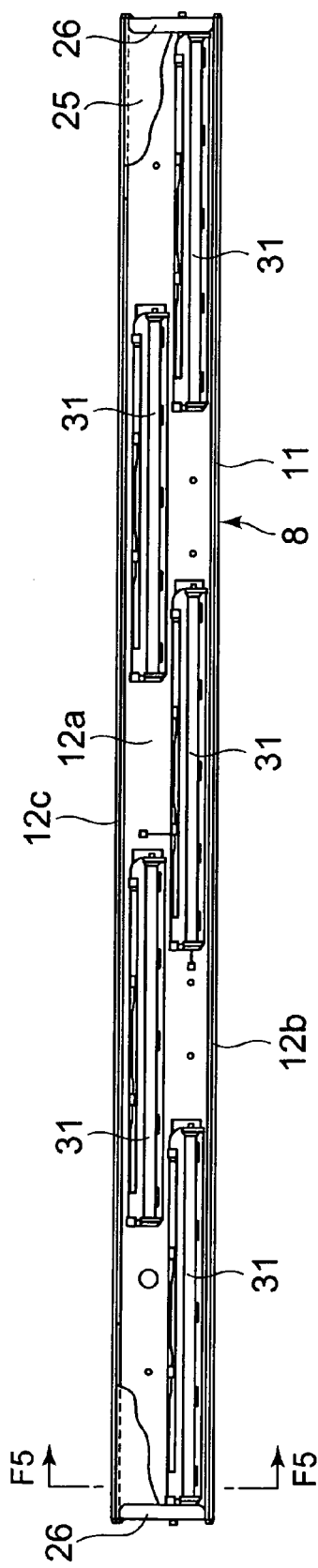
FIG. 3 is a partially cutaway plan view of the original reading unit according to the embodiment.

As shown in FIGS. 1A, 3 and 4, for example, five sensor assemblies 31 are employed, and as shown in FIGS. 8 to 14, each includes a sensor holder 32, a line sensor 51, a focus setup unit 64, a first leaf spring 61, as a first urging member, and a second leaf spring 62, as a second urging member.

Figure 9:
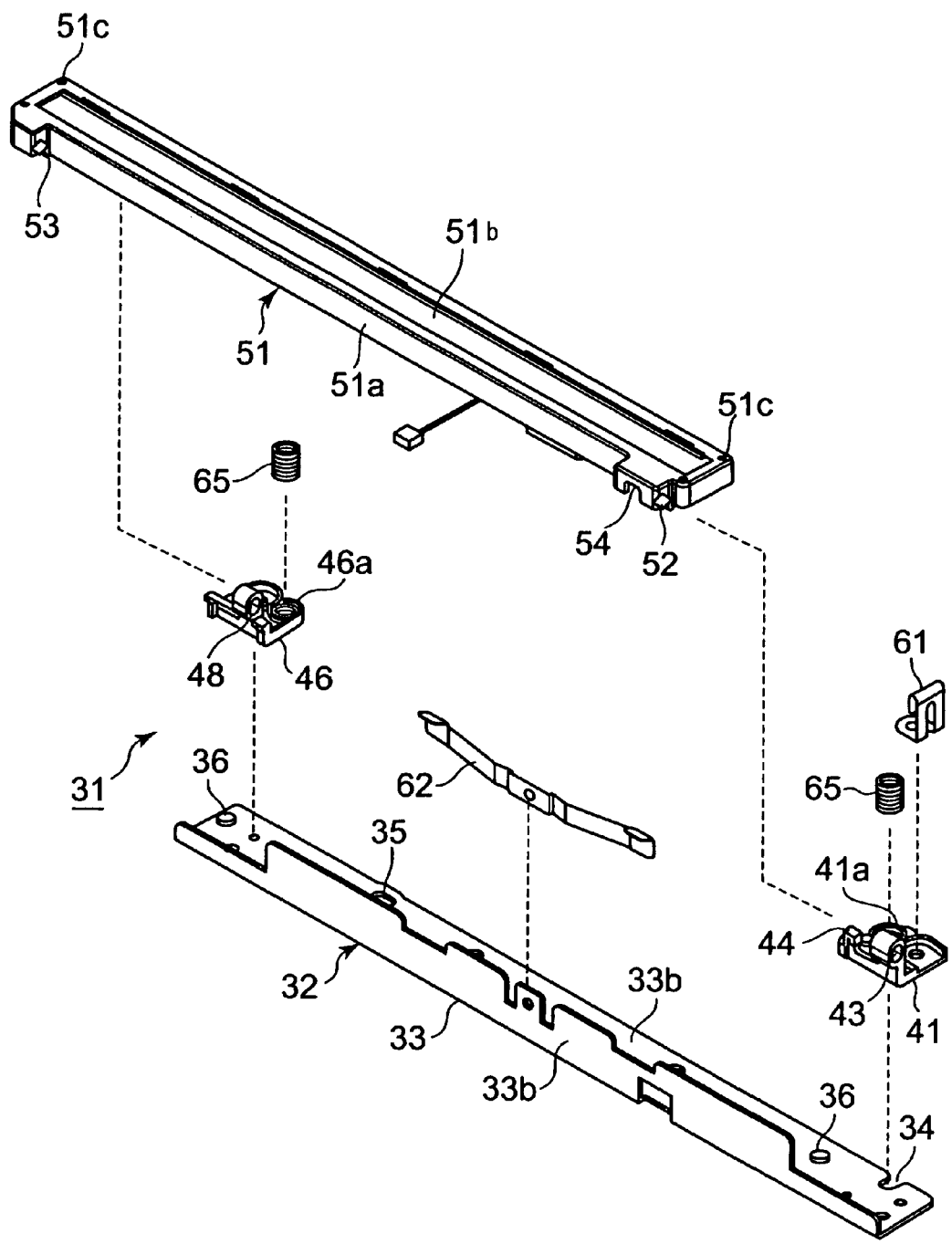
FIG. 9 is an exploded perspective view of the sensor assembly in FIG. 8.

As shown in FIG. 9, the sensor holder 32 includes a main holder member 33, a first support member 41 and a second support member 46.

Figure 11:
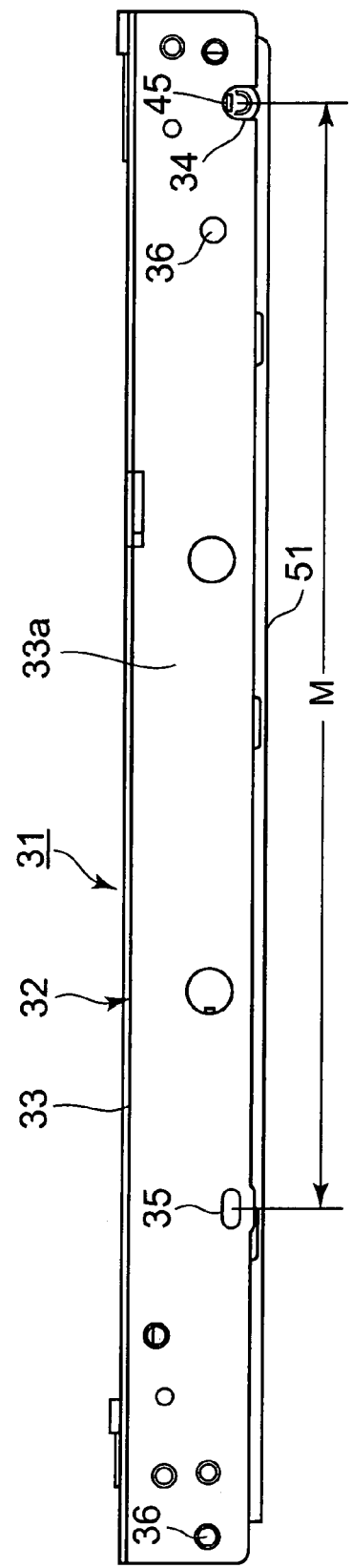
FIG. 11 is a bottom view of the sensor assembly in FIG. 8.
Figure 12:
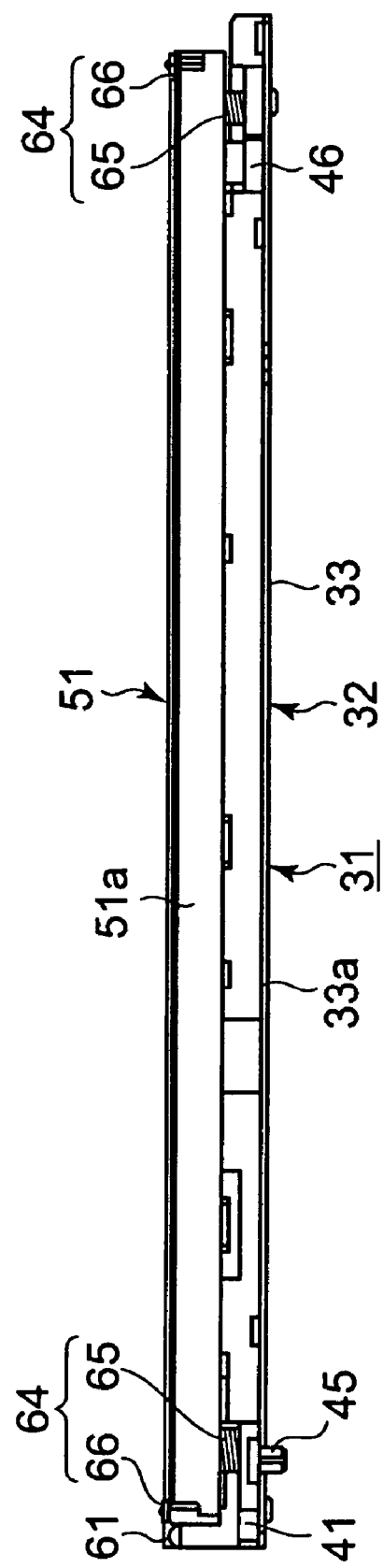
FIG. 12 is a diagram showing the sensor assembly viewed in the direction indicated by an arrow F12 in FIG. 10.

The main holder member 33 is made, for example, of sheet metal, and includes a rectangular base piece 33a and a spring sheet piece 33b that is obtained by bending one side edge of the base piece 33a upward. As shown in FIG. 11, a shaft insertion portion 34 that is, for example, a U-shaped notched groove is formed in one longitudinal end of the base piece 33a. This shaft insertion portion 34 may also be a hole. An elongated adjustment hole 35 is formed in the other longitudinal end of the base piece 33a, and the line of apsis of the adjustment hole 35 is extended in the longitudinal direction of the base piece 33a. A distance M, between the center of the adjustment hole 35 and the center of the shaft insertion portion 34, is set equal to the predetermined distance L described above. Further, multiple fastening holes 36 are formed in the base piece 33a.

Figure 13:
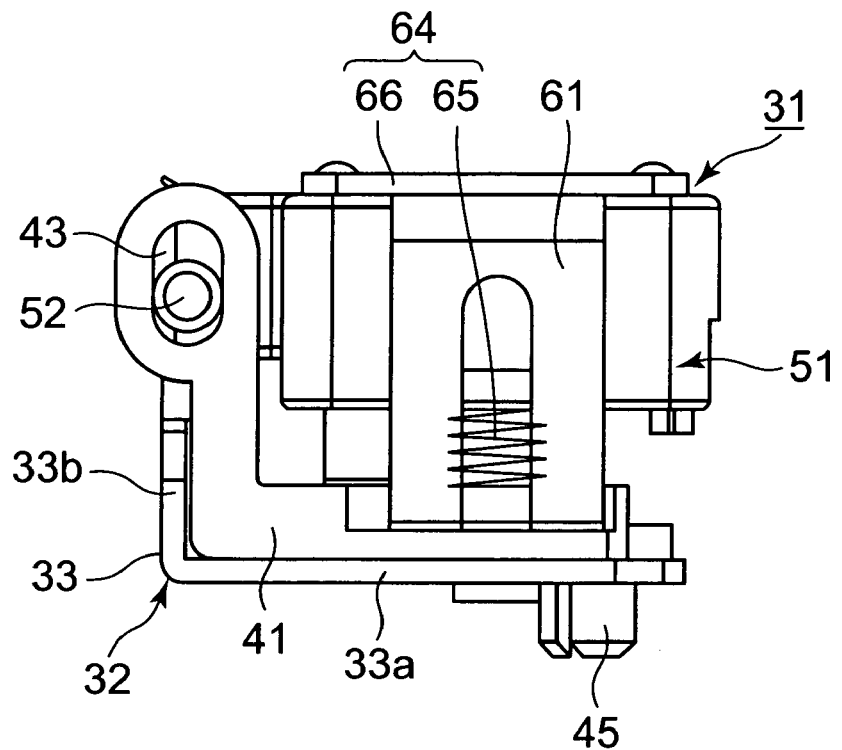
FIG. 13 is a right side view of the sensor assembly in FIG. 8.
Figure 14:
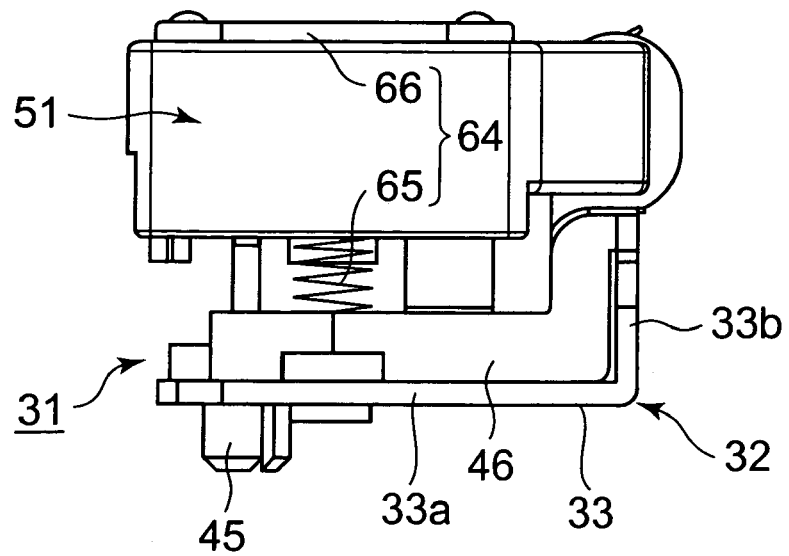
FIG. 14 is a left side view of the sensor assembly in FIG. 8.

The first support member 41 is, for example, a synthetic resin member fixed, using a screw (not shown), to the upper face of one longitudinal end of the base piece 33a in which the shaft insertion portion 34 is formed. As shown in FIGS. 9 and 13, the first support member 41 has a guide portion 43 and a stopper portion 44 that are positioned along the spring sheet piece 33b.

Figure 8:
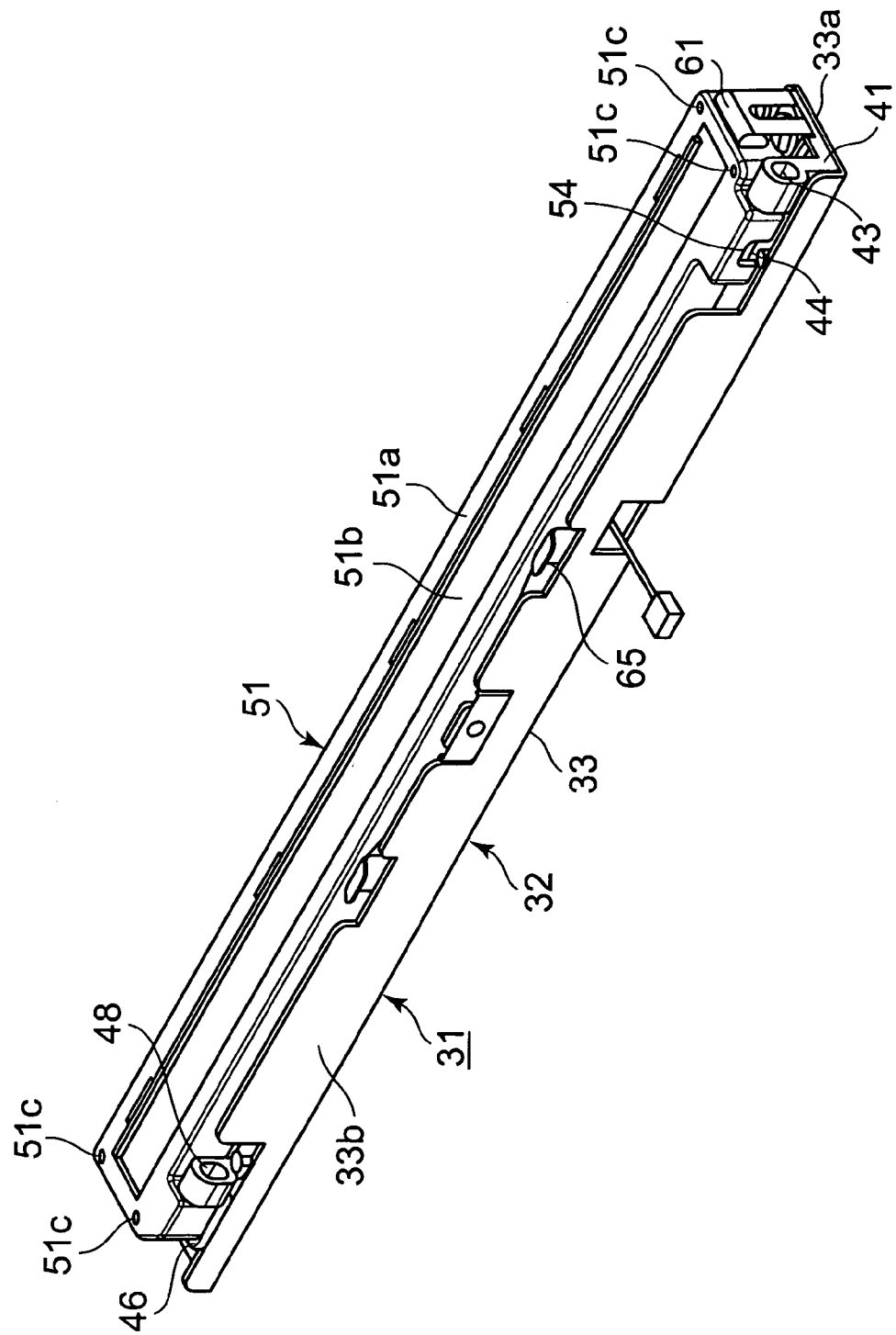
FIG. 8 is a perspective view of a sensor assembly provided for the original reading unit.

The guide portion 43 guides the line sensor 51 in the direction in which it approaches the wall 12a and the original support plate 25, or is separated therefrom, and also regulates the movements of the line sensor 51 in the sub-scanning direction. Therefore, the guide portion 43 is, for example, a vertically extended hole. It should be noted that the guide portion may be a groove having the same shape as the vertically elongated hole. When a fitting portion, which will be described later, is a vertically elongated hole, or a groove having the same shape as such an elongated hole, the guide portion 43 may be a shaft projected in the longitudinal direction of the base piece 33a. The stopper portion 44 is an upward protrusion, as shown in FIGS. 8 and 9.

Figure 10:
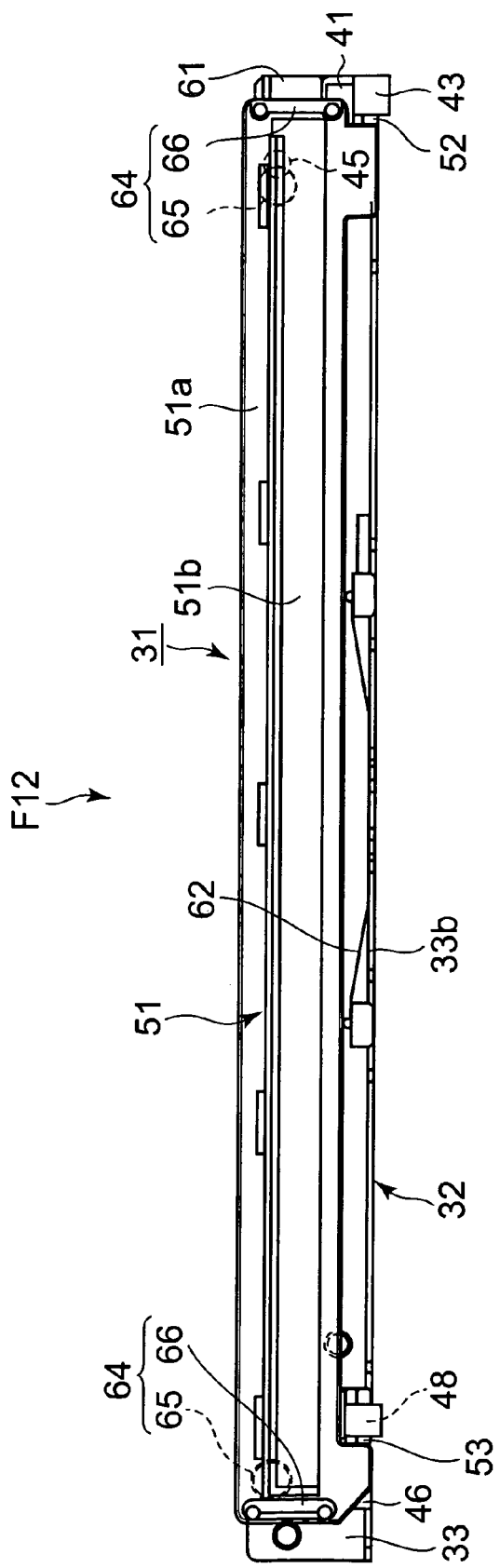
FIG. 10 is a plan view of the sensor assembly in FIG. 8.

A pivot 45 is integrally formed and projects downward from the reverse surface of the first support member 41. As shown in FIGS. 11 to 14, the pivot 45 has a tapered shape and includes multiple slots, so that it can be flexibly compressed in the direction of the diameter. The pivot 45 is passed through the shaft insertion portion 34 and tightly inserted into a bearing hole 15 of the unit base 11, and serves as the single rotation center relative to the sensor assembly 31. As shown in FIG. 10, the pivot 45 is located immediately under, or in the vicinity of, the light receiving device that is the first read in a light receiving device array for the line sensor 51, which will be described later, while at least part of the pivot 45 is positioned in an area for projection to the wall 12a.

The second support member 46 is, for example, a synthetic resin member, and is fixed, by a screw (not shown), to the upper face of the other longitudinal end of the base piece 33a at a position between the adjustment hole 35 and the fastening hole 36, but nearer the adjustment hole 35. As shown in FIG. 8, the second support member 46 has a guide portion 48 located along the spring sheet piece 33b.

The guide portion 48 guides the line sensor 51 in the direction in which the line sensor 51 approaches the wall 12a and the original support plate 25 or is separated from them, and, regulates the movement of the line sensor 51 in the sub-scanning direction. The guide portion 48 has the same structure as the guide portion 43 of the first support member 41, i.e., is a vertically elongated hole. The guide portion 48 may also be a groove having the same shape as such an elongated hole. When a fitting portion, which will be described later, is a vertically elongated hole, or a groove having the same shape as such an elongated hole, the guide portion 48 may be a shaft projected in the longitudinal direction of the base piece 33a.

Figure 5:
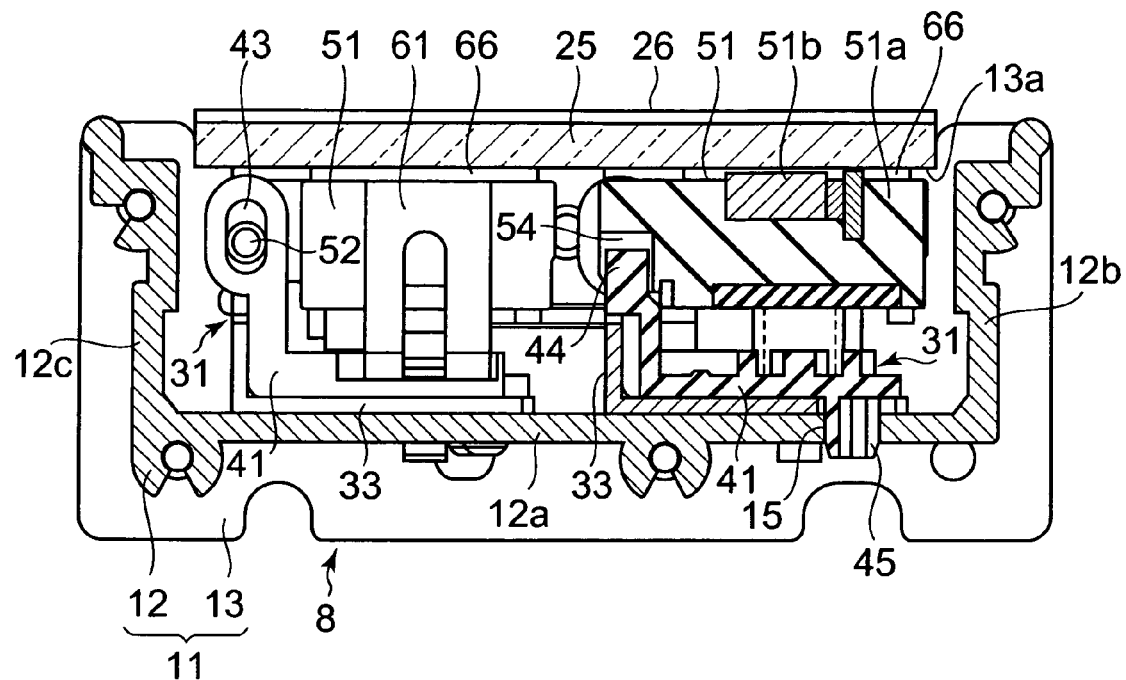
FIG. 5 is a cross-sectional view of the original reading unit taken along line F5-F5 in FIG. 3.

As shown in FIG. 5, the line sensor 51 is structured by uniformly exposing a sensor element 51b to the upper face of a sensor insulator 51a made of a synthetic resin. An input/output terminal (not shown), for example, is provided for the reverse face of the sensor insulator 51a. The sensor element 51b includes an array of multiple photo-electric conversion devices (not shown) arranged in the main scanning direction.

As shown in FIG. 9, fitting portions 52 and 53 are respectively provided at one longitudinal end and the other longitudinal end of the sensor insulator 51a. The fitting portions 52 and 53 are shaft portions that are extended, for example, in the longitudinal direction of the sensor insulator 51a and are projected in the same direction. Further, at one longitudinal end of the sensor insulator 51a, an engagement portion 54a is located in the vicinity of the fitting portion 52. The engagement portion 54 is, for example, a recessed portion. When the stopper portion 44 is a recessed portion for engaging the engagement portion 54, the engagement portion 54 need only be formed as a raised portion. The stopper portion 44 and the engagement portion 54 are fitted together with a small engagement gap.

When the line sensor 51 having the above described structure is to be assembled with the unit base 11, the pair of fitting portions 52 and 53 are individually fitted into the guide portions 43 and 48 of the first and second support members 41 and 46 of the unit base 11, and the engagement portion 54 engages the stopper portion 44 of the unit base 11.

The line sensor 51 is held so it can not move in the X direction and the Y direction in FIGS. 1A and 10, i.e., in the main scanning direction and in the sub-scanning direction. To hold the line sensor 51, a first leaf spring 61 and a second leaf spring 62 are employed.

Specifically, the first leaf spring 61 is secured to the first support member 41 by the above described screw (not shown) used to secure the first support member 41. The U-shaped portion of the first leaf spring 61 is flexibly pressed against one longitudinal end face of the line sensor 51, and the elastic force exerted by the first leaf spring 61 urges the line sensor 51 toward the other longitudinal end, i.e., in the main scanning direction. Therefore, one of the inner faces of the groove in the engagement portion 54 abuts upon the stopper portion 44, and movement of the line sensor 51 in the main scanning direction is prevented.

The second leaf spring 62 is fixed by a rivet, for example, to the longitudinal center of the spring sheet piece 33b, and is sandwiched and compressed between the spring sheet piece 33b and the line sensor 51. The line sensor 51 is urged in the sub-scanning direction by the elastic force exerted by both arm portions of the second leaf spring 62. Therefore, when the guide portions 43 and 48 are fitted into the engage portions 52 and 53, the guide portions 43 and 48 abut upon the inner faces of the fitting portions 52 and 53, and movement of the two ends of the line sensor 51 in the sub-scanning direction is restricted. As a result, movement of the line sensor 51 in the sub-scanning direction is prevented.

As described above, the line sensor 51 is held so that it can not move, relative to the unit base 11, either in the X direction or in the Y direction. Since this is achieved simply by employing the urging force applied to the line sensor 51 by the first leaf spring 61 and the second leaf spring 62, a special adjustment process for removing rattling due to dimensional tolerances is not required.

As shown in FIGS. 5 and 12 to 14, the focus setup unit 64 includes urging members, such as coil springs 65, which are pressing members, and spacers 66.

The coil springs 65 are used to move the line sensor 51 toward the original support plate 25, and are sandwiched and compressed between the unit base 11 and the reverse surface of the line sensor 51. A plurality of coil springs 65 are provided for uniformly pushing the line sensor 51, and these are located at positions where they can at least urge the two longitudinal ends of the line sensor 51 in the direction of the original support plate 25 (direction Z in FIG. 1B). In order to position the coil springs 65, as shown in FIG. 9, a spring sheet 41a, having a concave shape, is formed in the first support member 41, and a spring sheet 46a, also having a concave shape, is formed in the second support member 46.

The spacers 66 are formed of a hard resin, for example, and are sandwiched between the line sensor 51 and the original support plate 25 to delimit the focal depth of the light receiving device at a position extremely near the upper face of the original support plate 25. Therefore, a plurality of the spacers 66 are attached to the upper face of the line sensor 51. Specifically, protrusions (not shown) formed on the spacers 66 are inserted into portions separated from the sensor element 51b of the sensor insulator 51a, e.g., into holes 51c (see FIGS. 8 and 9) that are formed in the upper faces of the two longitudinal ends of the sensor insulator 51a. In this case, the spacers 66 are attached to the upper face of the line sensor 51 at the two longitudinal ends.

Figure 6:
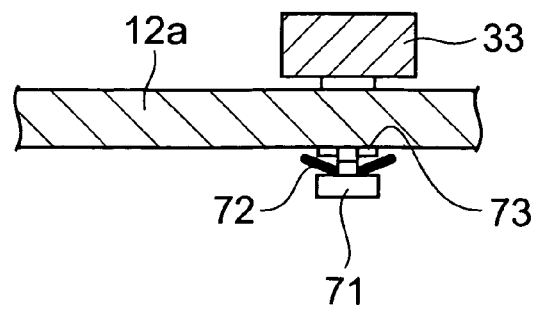
FIG. 6 is a diagram showing the holding mechanism of the sensor holder relative to the unit base in the original reading unit in FIG. 3.

Further, as shown in FIG. 6, a screw 71, a disc spring 72 and a washer 73 are employed in order to maintain the sensor assembly 31 at an adjusted position relative to the unit base 11. The screw 71 is used to connect the sensor holder 32 to the unit base 11, through the fastening hole 18, and the force used to fasten the screw 71 can be reduced to adjust the position of the sensor assembly 31. During such an adjustment, the disk spring 72 presses the sensor holder 32 against the unit base 11 through the application of an appropriate frictional force. By varying the strength of this friction force, the position of the sensor assembly 31 can be adjusted. The washer 73 is formed, for example, of an extremely smooth synthetic resin, and is provided in order that the sensor assembly 31 can be easily moved and its position adjusted.

In an original reading unit 8 having this arrangement, the following procedure is followed when arranging, at a predetermined distance in the sub-scanning direction, a first array and a second array of the sensor assemblies 31 between the original support plate 25 and the wall 12a of the unit base 11. The pivots 45 projecting downward from the lower faces of the sensor holders 32 are inserted and pressed down into the bearing holes 15 of the wall 12a, thereby attaching the sensor assemblies 31 so they can be rotated at the rotation centers comprising the bearing holes 15 and the pivots 45. Since once the pivots 45 have been inserted, elastic force causes them to expand in the direction of the diameter of the bearing holes 15, there are no gaps between the pivots 45 and the bearing holes 15. Further, since the line sensors 51 can be moved vertically and are urged upward by the coil springs 65, they are positioned so that the spacers 66 contact the reverse surface of the original support plate 25. Therefore, the appropriate focal distances for the line sensors 51 are set automatically, without any special process being required. At the same time, in response to the urging force exerted by the coil springs 65, the sensor holders 32 are pressed down and contact the upper face of the wall 12a of the unit base 11. In this temporary assembly state, the positions of the individual sensor assemblies 31, which are arranged in a zigzag pattern, are adjusted so they are parallel. During this adjustment process, the sensor assemblies 31 are rotated, as fulcrums, at their rotation centers. In this case, however, since there is no need to perform a troublesome process during which the positions of the two longitudinal ends of each sensor assembly 31 are alternately and repeatedly adjusted in the X direction and the Y direction, the parallel adjustment process is easily performed. In addition, since as described above, adjusting the focal distance is not necessary, the efficiency with which the work is performed is increased. During the above described adjustment operation, with the screws 71 loosened in advance, the sensor holders 32 of the sensor assemblies 31 are slid to the wall 12a of the unit base 11. And at the same time, the spacers 66 are slid across the original support plate 25 and the sensor assemblies 31 are rotated at their rotation centers and aligned so they are parallel. Then, when the screws 71 are again tightened, the parallel positioning of the sensor assemblies 31 can be maintained.

An adjustment apparatus that performs the parallel adjustment process is shown in FIGS. 15 to 18.

Figure 15:
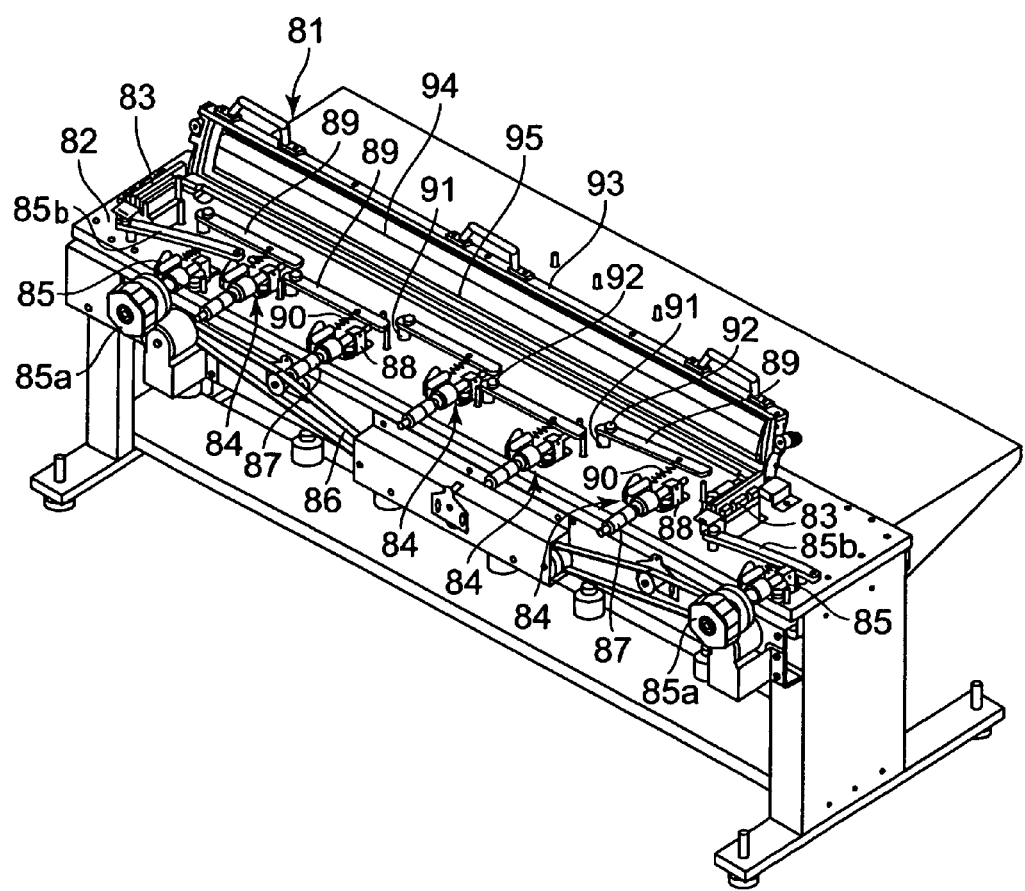
FIG. 15 is a perspective view of an adjustment apparatus for the original reading unit in FIG. 3.
Figure 16:
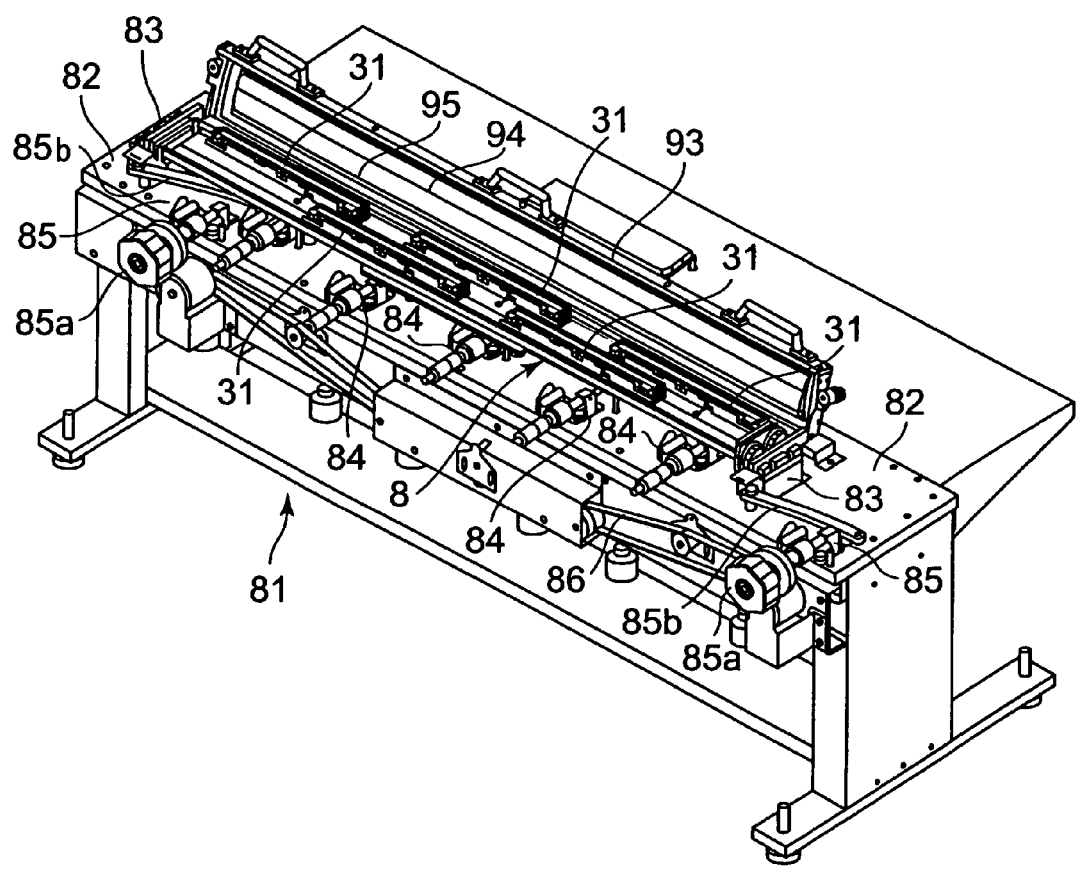
FIG. 16 is a perspective view of the state wherein the original reading unit in FIG. 3 is set into the adjustment apparatus in FIG. 15.

As shown in FIGS. 15 and 16, for the adjustment apparatus 81, a pair of left and right set blocks 83 are located on the upper face of an adjustment base 82, and adjustment jigs 84, consonant in number with the arrays of sensor assemblies 31, are positioned between the set blocks 83.

The original reading unit 8, which is detachably mounted on the pair of set blocks 83, can be moved forward and backward along movable rails (not shown) provided for the set blocks 83. In order to shift the movable rails, rail drive mechanisms 85 are provided on the upper face at the left and right ends of the adjustment base 82. Each of the rail drive mechanisms 85 includes a knob 85a and a lever 85b that rotates while following a shaft that is moved forward or retracted by rotating the knob 85*a*. Through the function provided by the lever 85*b*, which is fitted to the movable rail, the movement of the shaft is amplified and the movable rail is shifted forward or backward.

An interlocking mechanism 86 of a belt transmission type, for example, is provided for the adjustment base 82 to synchronize the movement of the pair of rail drive mechanisms 85. Since the movable rails of the set blocks 83 are synchronously moved forward or backward, the original reading unit 8 mounted at the paired set blocks 83 can be moved, in parallel, forward or backward.

Figure 17:
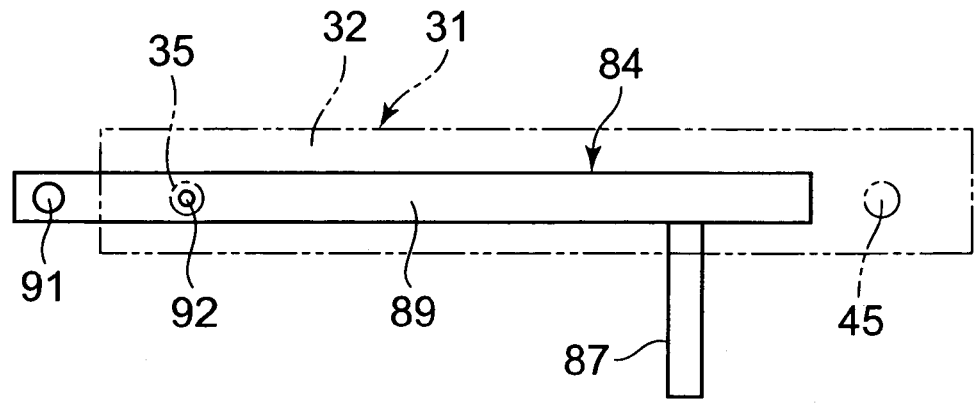
FIG. 17 is a schematic plan view of an adjustment jig prepared for use by the adjustment apparatus in FIG. 15.

The individual adjustment jigs 84 each include: a micro head 87, which is manually operated, a head holder 88, which holds the micro head 87 on the adjustment base 82, an adjustment lever 89 and a spring 90, which permits the adjustment lever 89 to follow the micro head 87. The adjustment lever 89 is rotatable at a support shaft 91 that supports one longitudinal end, and includes an upward adjustment pin 92 that is near the support shaft 91. As shown in FIG. 17, the micro heads 87 push the free ends of the adjustment levers 89 on the side opposite the support shafts 91. With this arrangement, since the travel distance for the adjustment pins 92 can be obtained in accordance with a ratio of the distance between the support shafts 91 and the micro heads 87 (the distance from the fulcrum to the point of force) and the distance between the support shafts 91 and the adjustment pins 92 (the distance from the fulcrum to the point of application), delicate adjustments of the rotation of the sensor assemblies 31 can be accurately and easily performed.

Figure 18:
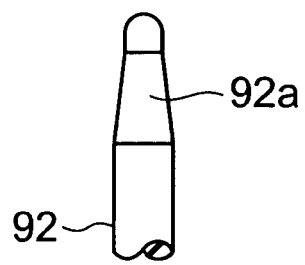
FIG. 18 is a side view of the distal end of the adjustment pin of the adjustment jig in FIG. 17.

As shown in FIG. 18, upper ends 92*a* of the adjustment pins 92 are tapered. Thus, when the upper ends 92*a* are inserted upward into the adjustment holes 35, gaps due to dimensional tolerance do not occur between the upper ends 92*a* and the adjustment holes 35.

A cover 93 is fitted to the adjustment base 82. The cover 93 is pivotable between a closed position, whereat the original reading unit 8 mounted on the adjustment base 82 is covered, and the open position shown in FIGS. 15 and 16. Two parallel reference lines 94 and 95 are extended across the inner face of the cover 93. These reference lines 94 and 95 are also parallel to the main scanning direction, and are made, for example, of a black line material.

When the original reading unit 8 is mounted on the adjustment base 82, the adjustment pins 92 are passed through corresponding pin through holes 16 in the unit base 11 and are inserted into adjustment holes 35 in the sensor holders 32. At this time, as shown in FIG. 17, the support shafts 91 of the adjustment levers 89 are located farther from the pivots 45 that serve as the rotation centers of the sensor assemblies 31, while the adjustment holes 35 and the adjustment pins 92 are located near the free ends of the sensor assemblies 31.

Under these conditions, the cover 93 is closed, and at first, for example, the sensor assemblies of the first array in the front are adjusted so that they are parallel to the reference line 94, which is also positioned in the front. During this adjustment process, electric power is supplied to the line sensors 51 which read the reference line 94, and the obtained data are displayed on a cathode-ray oscilloscope (not shown). Then, the micro heads 87 are operated to rotate the sensor assemblies 31 along the unit base 11. Through the rotation of the sensor assemblies 31, the position of the unit base 11 is simultaneously adjusted in the X direction and in the Y direction. During the adjustment, an operator monitors the cathode-ray oscilloscope, and halts the micro heads 87 when an appropriate display is obtained.

Thereafter, the operator operates the rail drive mechanisms 85 to move the original reading unit 8 in the direction in which the original is fed, i.e., in the sub-scanning direction (forward or backward in FIGS. 15 and 16). Then, in the above described manner, the sensor assemblies 31 of the second array in the rear are adjusted so that they are parallel to the reference line 95, which is also positioned in the rear. Since the reference line 95 is employed for the adjustment, only a short travel distance is required of the original reading unit 8, and efficiency is also increased. When it is desired that this operation be ignored, only one common reference line need be employed, instead of using both reference lines 94 and 95.

After the above described adjustment process has been is completed, the cover 93 is opened. And while the original reading unit 8 is still mounted on the set blocks 83, the sensor assemblies 31, which have been adjusted so that they are parallel, are secured by fastening the multiple screws 71 at the adjusted positions. As a result, the sensor assemblies 31 are secured to the unit base 11.

In the above described performance of the parallel adjustment process, the pivots 45, each of which functions as a single rotation center for the sensor assembly 31, are at least partially located in the area for projection to the wall 12*a*, and are provided immediately under or in the vicinity of the light receiving elements (also called first dots) that are first read from among the light receiving element array that will be described later of the line sensors 51. Therefore, the range of the rotation angle of each sensor assembly 31 can be greatly reduced, and changes in positioning can be easily identified, visually, by using an oscilloscope. Thus, the efficiency with which adjustments are performed can be increased.

In addition, in the above described performance of the parallel adjustment process, the distance between the two reference lines 94 and 95 is known, and the distance the rail drive mechanisms 85 move the original reading unit 8 in the sub-scanning direction can be readily identified by viewing an oscilloscope. Therefore, the distance in the sub-scanning direction between the individual sensor assemblies 31 that are adjusted so that they are parallel can be obtained. The data for the distance between the sensor assemblies 31 (a shift in the sub-scanning direction) is stored in the memory in advance. After the adjustment has been completed, and while the original reading unit 8 attached to the original base 7 of the original reading section 5 is being employed to read data from the sensor assemblies 31, the data reading timing is electrically controlled by using the data stored in the memory. As a result, the shift in the sub-scanning direction can be eliminated, and the data read from the line sensors 51 can be continued as lines.

Through this processing, a copier 1 according to this embodiment can scan an original passed through the image reading section 5 and obtain image data having a maximum effective width of, for example, nine hundred and several tens of millimeters. The obtained image data are transmitted as digital data to the image forming section 4, and the image forming section 4 performs image forming on a sheet supplied from the paper supply section 3.

Figure 19:
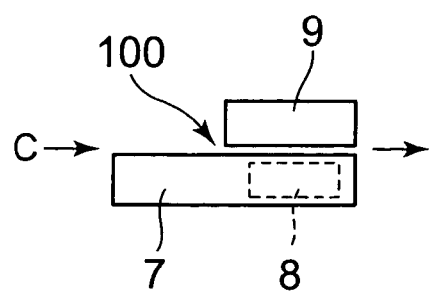
FIG. 19 is a schematic side view of an image scanner comprising an original reader that includes the original reading unit according to another embodiment of the present invention.

FIG. 19 is a diagram showing another embodiment of the present invention. In this embodiment, the original reading section 5 of the copier 1 in FIG. 2 is provided as an image scanner 100. Since the arrangement of the image scanner 100 is the same as the original reading section 5 described above, the same reference numerals are employed for the corresponding components, and no further explanation will be given. The image scanner 100 obtains the same effects those obtained by the above described embodiment, and can also achieve the objective of the present invention.

What is claimed is:

1. An original reading unit comprising:
   a unit base;
   a transparent original support plate attached to the unit base; and
   multiple sensor assemblies arranged in a zigzag pattern to form on the unit base a first array of the sensor assemblies extending in a main scanning direction for performing a first reading of an original document and a second array of the sensor assemblies extending in the main scanning direction for performing a second reading of the original document following the first reading by the first array of the sensor assemblies;
   wherein each of the sensor assemblies includes:
      a sensor holder mounted for undergoing pivotal movement about a single rotation center as a fulcrum along a wall of the unit base to bring the sensor holder to a predetermined position so that the sensor holder can be fixed to the wall of the unit base;
      a line sensor mounted relative to the sensor holder so as not to be shifted in the main scanning direction or in a sub-scanning direction, and mounted for undergoing movement in an approaching or a separating direction so as to be brought into contact with or separated from, respectively, the wall of the unit base and the original support plate; and
      a focus setup unit that moves the line sensor in the approaching or separating direction and that positions the line sensor at a location whereat focus can be adjusted.

2. An original reading unit according to claim 1; further comprising a first urging member that pushes the line sensor from one longitudinal end thereof in the main scanning direction and a second urging member that pushes the line sensor in the sub-scanning direction so that the first and second urging members hold the line sensor relative to the sensor holder to prevent the line sensor from moving in the main scanning direction and the sub-scanning direction.

3. An original reading unit according to claim 1; wherein at least part of the rotation center is located in a projection area for the line sensor relative to the wall of the unit base.

4. An original reading unit according to claim 1; wherein the rotation center is located immediately under, or in the vicinity of, a light-receiving device that is the first read among an array of light-receiving devices for the line sensors of the sensor assemblies.

5. An original reading unit according to claim 1; wherein the focus setup unit comprises a plurality of pressing members that move the line sensor toward the original support plate, and a plurality of spacers that are sandwiched between the line sensor and the original support plate to set a focal distance for the line sensor.

6. An original reading unit according to claim 5; wherein each of the pressing members comprises an urging member.

7. An original reading unit according to claim 1; further comprising:
   a first support member attached to one longitudinal end of the sensor holder, the first support member including a guide portion for guiding the line sensor during movement thereof in the approaching or separating direction and for regulating the movement of the line sensor in the sub-scanning direction, and including a stopper portion for regulating the movement of the line sensor in the main scanning direction;
   a second support member attached to the other longitudinal end of the sensor holder, the second support member including a guide portion for guiding the line sensor during movement thereof in the approaching or separating direction and for regulating the movement of the line sensor in the sub-scanning direction;
   a plurality of fitting portions slidably fitted into the guide portions of the first and second support members, and an engagement portion that abuts upon the stopper portion;
   first urging members attached to the first support member to apply an urging force to the line sensor in the main scanning direction and cause the engagement portion to abut upon the stopper portion, and second urging members sandwiched between the sensor holder and the line sensor to apply an urging force to the line sensor in the sub-scanning direction;
   a plurality of pressing members formed of the first and second urging members and sandwiched between the first and second support members and the line sensors; and
   a plurality of spacers that set a focal distance of the line sensor and are sandwiched between the line sensor and the original support plate.

8. An image forming apparatus comprising an original reader that includes an original reading unit according to claim 1.

9. An image scanner comprising an original reader that includes an original reading unit according to claim 1.

* * * * *

UNITED STATES PATENT AND TRADEMARK OFFICE
CERTIFICATE OF CORRECTION

PATENT NO. : 7,595,913 B2  Page 1 of 1
APPLICATION NO. : 11/230902
DATED : September 29, 2009
INVENTOR(S) : Shinobu Hirayama It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1040 days.

Signed and Sealed this

Twenty-eighth Day of September, 2010

David J. Kappos
*Director of the United States Patent and Trademark Office*